UNITED STATES PATENT OFFICE.

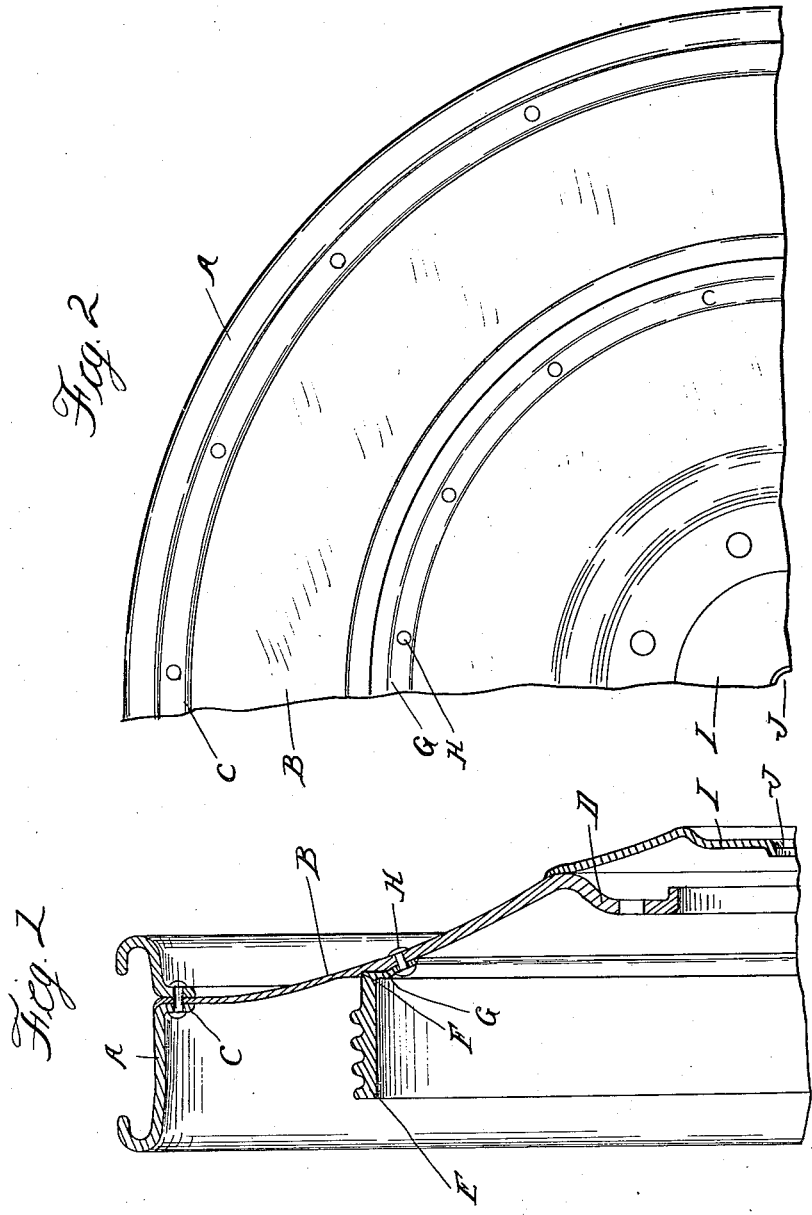

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

DISK WHEEL.

1,414,375. Specification of Letters Patent. Patented May 2, 1922.

Application filed April 15, 1920. Serial No. 374,170.

*To all whom it may concern:*

Be it known that I, ALDEN L. PUTNAM, a citizen of the United States of America, residing at Detroit, in the county of Wayne and State of Michigan, have invented certain new and useful Improvements in Disk Wheels, of which the following is a specification, reference being had therein to the accompanying drawings.

The invention relates to wheels of the dished disk type and has for its object the obtaining of a construction which may be used in connection with steering wheels and which provides for the application of a brake thereto without interference with the steering movement.

In the drawings:

Figure 1 is a cross-section through a portion of the wheel;

Figure 2 is an elevation thereof.

A is the wheel rim, B is a dished disk of outwardly tapering section, which is attached to the rim by suitable means such as by clamping between radially inwardly-extending flanges C on said rim.

For most uses, it has been found desirable to so arrange the dished disk that a portion thereof extending radially inward from the rim will approach the central plane of rotation or plane of impact. Where, however, the wheel is used on a motor vehicle having driven steering axles, it is desirable to apply a brake thereto and it is further desirable that the central plane of this brake should be as near as possible to the pivotal axis of the steering axle. If, therefore, the disk were to extend radially inward towards the plane of impact, this would interfere with such location of the brake. I have overcome the difficulty by forming the disk in its radially inwardly extending portion, so that it is receding from the central plane of rotation or plane of impact and by so doing, I have provided space for the arrangement of the brake flange.

In detail, the disk B is fashioned as shown, having its radially inwardly-extending portion curving laterally outward from the plane of impact, while the portion D adjacent to the hub is reversely dished to extend again towards the plane of impact. E is the brake flange which has a shouldered engagement F with the disk and is provided with a securing flange G, which is riveted or otherwise secured to said disk, as indicated at H. The space within the flange E is laterally enlarged by the dishing of the disk, so as to provide abundant room for the placing of the brake mechanism (not shown). The disk may be mounted upon the hub by any suitable means (not shown) and the outer end of the hub is concealed by a cap plate I having a central aperture J for a securing bolt or screw.

What I claim as my invention is:

1. A wheel comprising a rim, a dished disk of tapering section secured to said rim and arranged in such relation thereto that a radially inwardly-extending portion is inclined laterally outward from the central plane of rotation or plane of impact, and a brake flange secured outwardly of the plane of impact to the outwardly inclined portion of said disk.

2. A wheel comprising a rim, a dished disk of tapering section having its peripheral portion secured to said rim in a plane laterally outwardly offset from the central plane of rotation or plane of impact and a portion of said disk extending radially inward from its attachment to the flange, being inclined laterally outward from said plane of impact, and a brake flange secured to said laterally outwardly inclined portion.

3. A wheel comprising a rim, a dished disk of tapering section secured to said rim and arranged in such relation thereto that a radially inwardly-extending portion is inclined laterally outward from the central plane of rotation or plane of impact, and a brake flange secured to the inclined portion of said disk and extending therefrom towards said plane of impact.

4. A wheel comprising a rim, a dished disk of tapering section secured to said rim and arranged in such relation thereto that a radially inwardly-extending portion is inclined laterally outward from the central plane of rotation or plane of impact, and a brake flange secured to the inclined portion of said disk extending laterally therefrom and arranged centrally of said plane of impact.

In testimony whereof I affix my signature.

ALDEN L. PUTNAM.